UNITED STATES PATENT OFFICE.

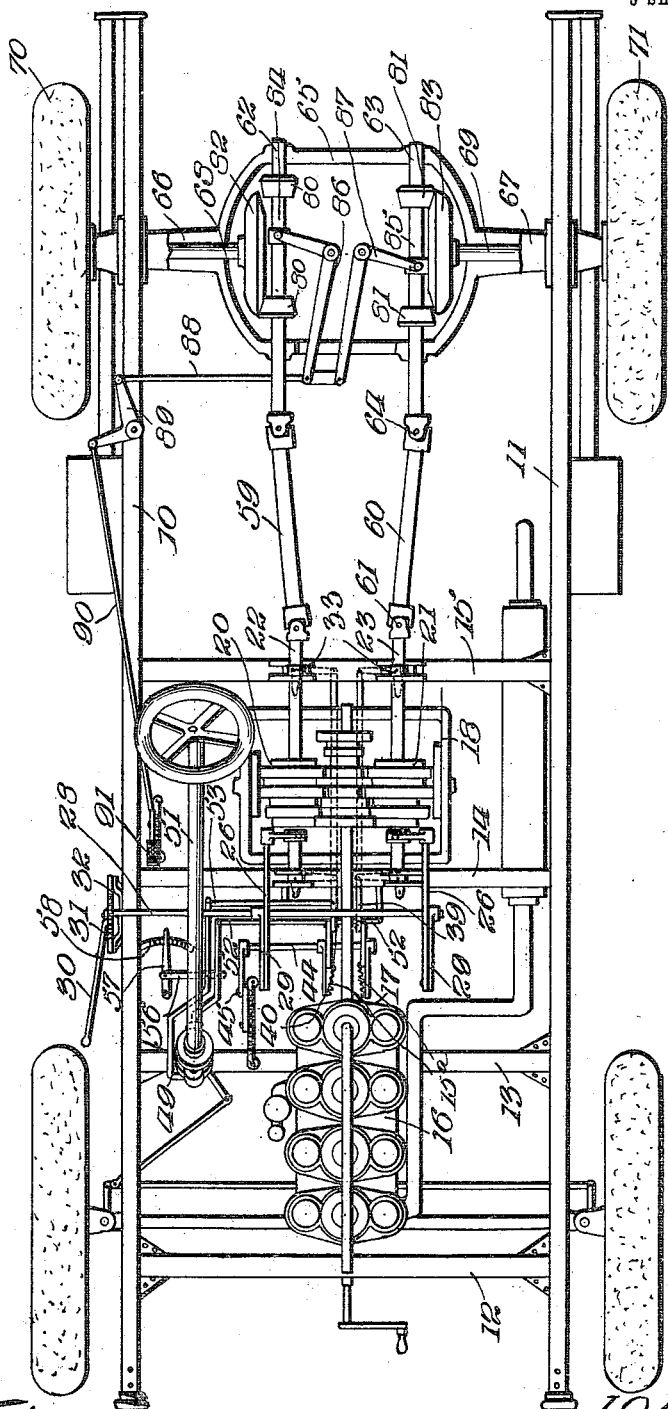

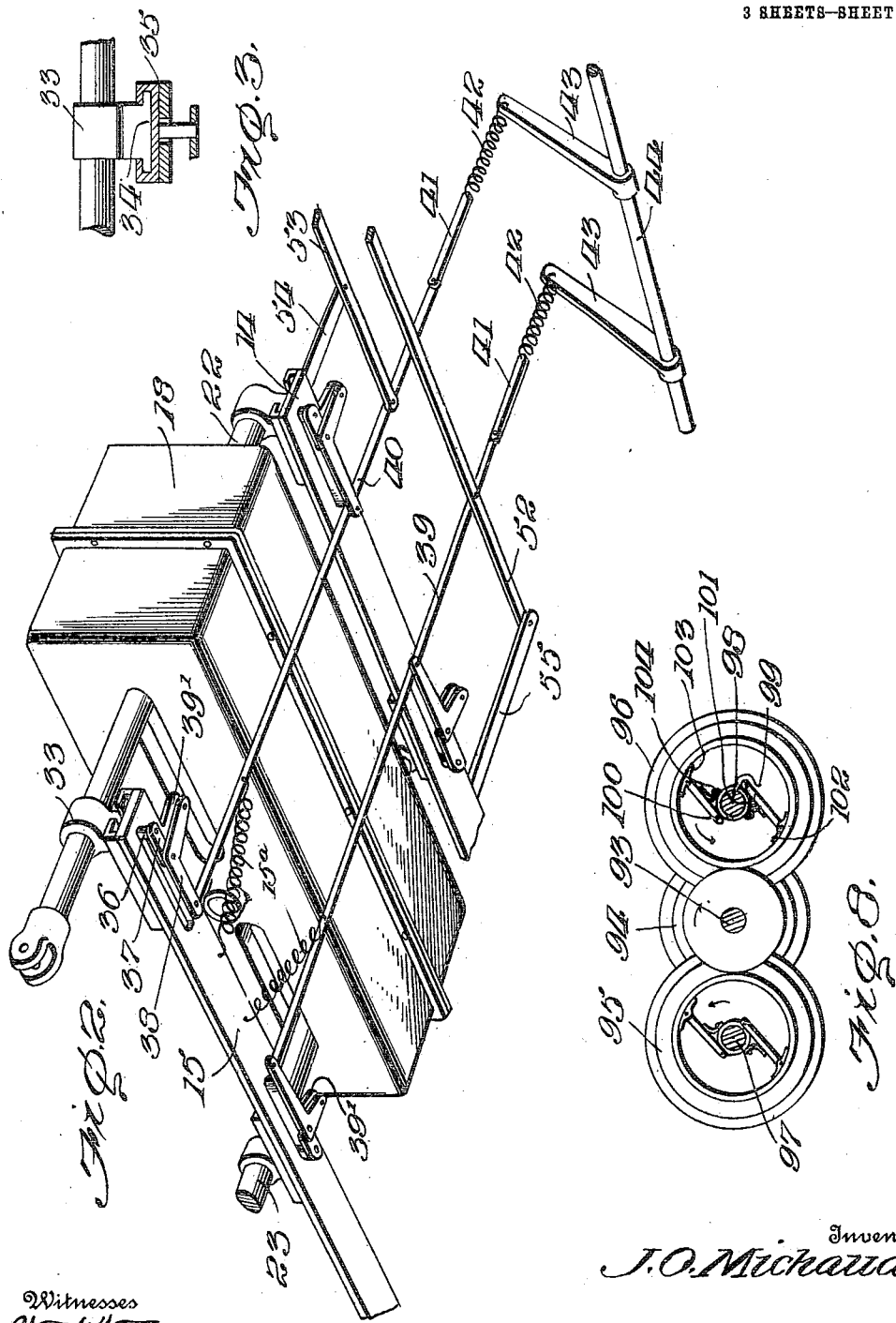

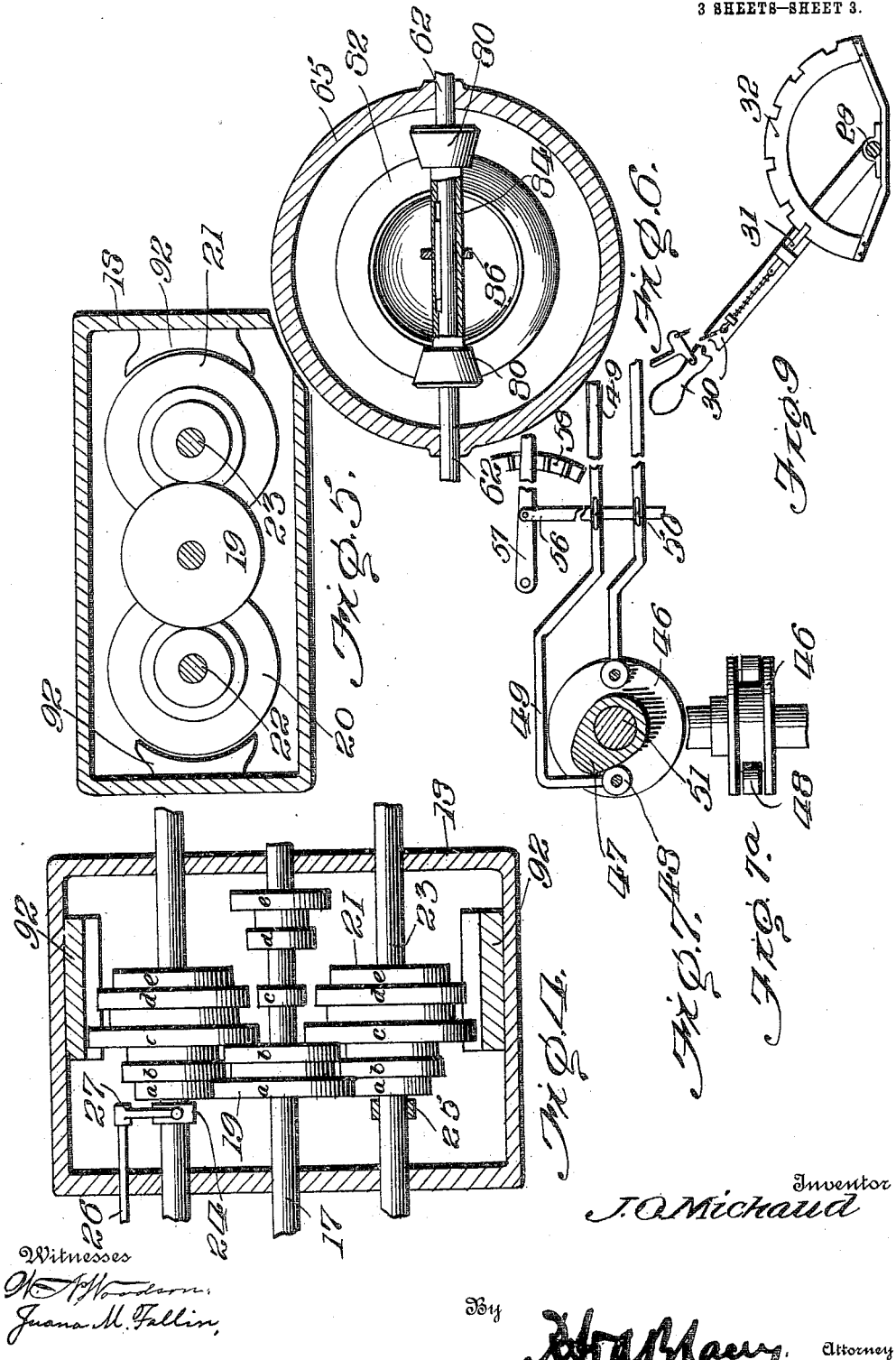

JOSEPH O. MICHAUD, OF FORT KENT, MAINE.

POWER-TRANSMISSION MECHANISM.

979,534.
Specification of Letters Patent.
Patented Dec. 27, 1910.

Application filed August 20, 1909. Serial No. 513,829.

*To all whom it may concern:*

Be it known that I, JOSEPH O. MICHAUD, citizen of the United States, residing at Fort Kent, in the county of Aroostook and State of Maine, have invented certain new and useful Improvements in Power-Transmission Mechanism, of which the following is a specification.

This invention relates to gearing and refers particularly to a novel transmission mechanism adaptable to a motor vehicle for distributing power from a motor to wheels which are connected to the same.

The invention has for an object the provision of a novel transmission mechanism for distributing the power of the motor to the two rear wheels of a motor vehicle independently of one another and of a peculiar arrangement of the transmission mechanism whereby the balance or differential gear is not required.

The invention has for a still further object the peculiar arrangement of the elements of the transmission mechanism whereby the same is under the complete control of the operator independent of the steering mechanism and whereby a reverse movement of the car may be had, the same being effected by simply reversing the gears upon the rear axles when the various speeds obtained through the transmission mechanism may be brought into operation.

For a full understanding of the invention and the merits thereof, and also to acquire a knowledge of the details of construction, and the means for effecting the result, reference is to be had to the following description and accompanying drawings, in which:—

Figure 1 is a top plan view of the chassis of a motor vehicle disclosing the improved transmission mechanism and relative parts thereof applied to the same. Fig. 2 is a bottom perspective view of the transmission casing disclosing the operating shafts and levers connected to the same. Fig. 3 is a detail sectional view of one of the guides disclosing the slidable journal bearing mounted in the same. Fig. 4 is a horizontal section through the transmission casing disclosing the speed changing devices mounted therein. Fig. 5 is a vertical section taken intermediately through the transmission casing disclosing the coöperating drums located in the same. Fig. 6 is a vertical transverse section in the rear axle housing disclosing the means for reversing the direction of the rear axles. Fig. 7 is a transverse section of the lower end of the steering post and connections therewith; Fig. 7ª is a side elevation of the same, a fragmentary view of the steering post being disclosed. Fig. 8 is a modification of the coöperating drums disclosing a clutch as applied to the same. Fig. 9 is a detail view of the hand lever and segment employed in connection with the improved transmission mechanism.

Corresponding and like parts are referred to in the following description and indicated in all the views of the accompanying drawings by the same reference characters.

In the drawings in which is disclosed an embodiment of the invention as applied to a motor vehicle, the numerals 10 and 11 designate the side beams of the frame which are provided with the transverse beams 12, 13, 14, and 15 which are respectively positioned in spaced relation throughout the lengths of the side beams 10 and 11. Transverse beams 13 and 14 are employed not only for the purpose of bracing the side beams 10 and 11 but also to serve the purpose of supporting the motor 16 and the improved transmission mechanism employed.

The motor 16 is mounted in the forward end of the frame and is provided with a rearwardly extending drive-shaft 17 which projects into the transmission casing 18 in the opposite walls of which the same is journaled. Upon the shaft 17 and within the casing 18 a plurality of disks 19 are mounted which vary in diameter in order to engage with pluralities of disks 20 and 21 carried upon jack-shafts 22 and 23 journaled in the casing 18 parallel with the drive or power shaft 17. The disks 20 and 21, like the disks 19 are secured together in any suitable manner so as to move uniformly, the same being preferably formed of metallic drums which are ground to provide the several parts varying in diameter to correspond to the various speeds desired. The disks 20 and 21 are keyed upon the jack-shafts 22 and 23 to permit longitudinal movement of the same but to rotate rigidly therewith so as to dispose the several disks in relation with the disks 19 to change the gear ratios between the drive shaft 17 and the jack-shafts 22 and 23. In the present instance the disks are so formed as to obtain five ratios of the speed of the jack-shafts 22 and 23 relative to the drive shaft 17, the ratios being indicated by the letters a, b, c, d, and e upon the disks 19, 20 and 21. For instance, one speed is obtained when the disks a of the shafts 17, 22 and 23 are brought into engagement with one another and the second speed is obtained when all of the disks b are brought into engagement with one another. The remaining speeds are likewise obtained by sliding the disks 20 and 21 along the jack-shafts 22 and 23 and bringing into alinement the disks c, d, and e respectively.

The drums or disks 20 and 21 are formed with loose collars 24 and 25 which permit of the rotation of the drums 20 and 21 but which are secured to the same in such manner as to cause the longitudinal movement of the drums 20 and 21 under the action of the collars 24 and 25. For the purpose of moving the collars 24 and 25 slide rods 26 are employed which project through the front wall of the casing 18 and carry upon their inner ends, forks 27 which are engaged at diametrically opposite points upon the collars 24 and 25 and are employed for actuating the same. The mechanism for reciprocating the slide rods 26 includes a bar 28 which is transversely disposed across the frame of the vehicle forwardly of the casing 18 and which carries in spaced relation, forwardly and upwardly extended arms 29 which are loosely connected to the slide rods 26 and which operate the same by the rotation of the bar 28. One extremity of the bar 28 extends outwardly of the side beam 10 of the frame and is rigidly connected to an upwardly extending hand lever 30 which is locked in adjusted position through the medium of a pawl 31 carried upon the lever which intermeshes with a segment 32 mounted upon the side beam 10 in concentric relation to the bar 28. By this mechanism it is seen that the drums 20 and 21 may be locked in adjusted position in order to secure the relative disks in alinement to obtain the speed desired.

For the purpose of disengaging the drums 20 and 21 from the drum 19 the jack-shafts 22 and 23 are mounted upon journal bearings 33 which are provided with depending T-heads 34 slidably mounted in transverse guides 35 mounted upon the transverse beams 14 and 15 at the opposite sides of the casing 18. The T-heads 34 are provided with depending projections 36 which extend downwardly through the beams 14 and 15 and are pivotally connected upon links 37 which are carried at the intermediate portion of the bell-crank levers 38. The bell-crank levers 38 are so positioned that one arm of each of the same is disposed in parallel with the transverse beams 14 and 15 while the opposite arm extends forwardly of the frame and is pivotally carried upon forwardly projected lugs 39 extended from the beams 14 and 15. The journal bearings 33 are thus disposed in pairs at the opposite sides of the transmission casing 18 and in longitudinal alinement, one being engaged about each end of the jack-shafts 22 and 23 through the medium of which the shafts are alternately brought into engagement with and reciprocated from the main drive shaft 17. Reach-rods 39 and 40 are employed which are secured to the inwardly extending arms of the bell-crank levers 38, and are thereby separately connected to the jack-shafts. The reach rods 39 and 40 are yieldably held in a backward position by retractile springs 15$^a$. The springs 15$^a$ are secured to the rods 39 and 40 at points spaced forwardly from their rear extremities, and converge backwardly where their rear ends are secured to the central portion of the cross brace 15. The forward ends of the reach-rods 39 and 40 are connected through the medium of links 41 to coiled springs 42 which are carried upon the outer extremities of arms 43 mounted upon a rod 44 adapted to be rotated through the medium of a foot pedal 45 connected to the same and positioned upon the frame of the vehicle adjacent the operator's seat.

The means which is employed in connection with this transmission mechanism for automatically throwing the drums 20 and 21 alternately out of engagement with the drums 19 in order to permit of the turning of the vehicle comprises a pulley 46 having a cam 47 formed in the peripheral groove of the same which alternately strikes against rollers 48 mounted in the extremities of push rods 49 and 50 in order to vibrate the rods 49 and 50 upon the rotation of the steering post of the vehicle. The push rods 49 and 50 extend backwardly from the steering post 51 and are pivotally engaged with levers 52 and 53 which extend inwardly from the push rods 49 and 50 and are pivotally mounted upon the reach rods 39 and 40. The inner extremity of the lever 33 is pivotally connected upon the reach rod 40 while the lever 53 is fulcrumed upon a forwardly projected arm 54 carried upon the transverse beam 14 in order to impart a vibratory movement to the inner extremity of the lever 53 upon the extension of the push rod 49; the opposite lever 52 is pivoted intermediately upon the reach rod 39 while its inner extremity is fulcrumed upon the second forwardly extended arm 55 carried upon the transverse beam 14 in order to impart an opposite vibratory movement to the reach rod 39 upon movement of the push-rod 50. For the purpose of releasing the push rods 49 and 50 from the pulley 46, which is mounted upon the steering post 51, a link 56 is employed which is connected at its inner end to the intermediate portions of the push rods 49 and 50 and admits of the longitudinal vibration of the rods independently of the link 56. The link 56 is extended outwardly from the push rods 49 and 50 toward the side beam 10 where it is pivotally connected to a hand lever 57. The lever 57 is pivotally engaged at its forward end upon the frame of the vehicle and lies in a horizontal position. The frame of the vehicle also carries a segment 58 which receives the rear end of the lever 57 and holds the same in adjusted position through the frictional contact between the lever 57 and the segment 58.

The jack-shafts 22 and 23 are provided with propeller shafts 59 and 60 which are connected thereto through the medium of universal joints 61 and which are connected to stub shafts 62 and 63 through the medium of the universal joints connected to the rear extremities of the propeller shafts 59 and 60. At the rear of the frame of the vehicle a housing 65 is disposed which terminates at its outer extremity in sleeves 66 and 67 through which are journaled the rear axles 68 and 69 supporting upon their outer extremities the drive wheels 70 and 71 of the vehicle. The stub-shafts 62 and 63 are journaled transversely through the housing 65 adjacent the inner ends of the rear axles 68 and 69 and are provided with spaced beveled pinions 80 and 81, which alternately engage with beveled gears 82 and 83 carried upon the inner extremities of the rear axles 68 and 69. The pinions 80 and 81 are carried upon the sleeves 84 and 85 which are loosely mounted upon the stub shafts 62 and 63 and are actuated through the medium of bell-crank levers 86 and 87 centrally disposed within the housing 65 and having their long arms extended forwardly through the housing 65. The short arms of the bell-crank levers 86 and 87 are forked to engage about the sleeves 84 and 85 with which they are pivotally engaged in order to impart a sliding motion to the same. A connecting rod 88 is pivotally secured to the outer ends of the bell-crank levers 86 and 87, the outer end of the connecting rod 88 being pivotally engaged to one arm of a bell-crank lever 89 upon the longitudinal beam 10 and provided with a connecting rod 90 which is secured to a foot pedal 91 at the forward end of the vehicle adjacent the operator's seat.

For the purpose of automatically braking the drums 20 and 21 when released from the power or central drum 19, brake shoes 92 are employed which are located in the opposite ends of the transmission casing 18, and are projected inwardly to such an extent, and are of such a breadth that the drums 20 and 21 are brought into engagement therewith upon a slight outward movement of the same from the power drum 19 irrespective of their longitudinal adjustment within the casing 18. This latter construction is disclosed in Fig. 5 of the drawings.

In Fig. 8 a modification is disclosed in which the power shaft 93 which is extended from the motor 16 is provided with a drum 94 of the same formation as the drum 19, while the drums 95 and 96 are of similar formation to the drums 20 and 21, with the exception that instead of the employment of the sliding journals 33 to release the drums 95 and 96 from engagement with the power drum 94 a clutch mechanism is employed for permitting of the excess rotation of the drums 95 and 96 about the jack-shafts 97 and 98 alternately in accordance with the turning of the vehicle. The jack-shafts 97 and 98 are each provided with rigid collars having oppositely extended lugs 100 to which are pivotally secured the clutch arms 101 upon the outer ends of which the shoes 102 are disposed. The shoes 102 are engaged against the inner surface of a drum 103 which is employed upon each of the drums 95 and 96, the shoes being frictionally held against the drum 103 through the medium of springs 104 which are carried upon the collars 99 and engaged against the arms 101. The arms 101 extend tangentially from the collar 99 and thereby are so positioned as to cause a binding action of the shoe 102 under the pressure of the adjacent spring 104. This modified form of the compensating means for permitting of the accelerated speed of one jack-shaft over the other when the vehicle is turning is employed in lieu of the mechanism for supporting the jack-shafts as above described or using the well-known balance or differential mechanism.

When it is desired to start the motor vehicle the operator grasps the hand lever 30 and swings the same opposite the desired tooth in the segment 32, when he releases the pawl 31 and locks the lever in such position. This operation swings the arms 29 and moves the slide rods 26 to carry the drums 20 and 21 into the desired position for registering the disks upon the drums 20 and 21 to obtain the first or slow speed of the machine. As will be seen from Fig. 4 this is effected by bringing the disks $c$ into the same plane whereby the small disk upon the drum 19 is registered with the largest disk $c$ upon the drums 20 and 21. Having thus set the drums the operator throws the foot lever 45 forward in order to draw the reach rods 39 and 40 forwardly and to slide the journals 33 inwardly by reason of the links 37 connected to the T-heads 34 of the journal bearings 33 and to the bell-crank levers 38. This movement carries the drums 20 and 21 into engagement with the drum 19 whereby the motion of the motor 16 is transmitted to the jack-shafts 22 and 23. From the jack-shafts 22 and 23 the power is transmitted through the propeller shafts 59 and 60 to the stub shafts 62 and 63 whereby the pinions 80 and 81 are rotated and caused to revolve with the rear axles 68 and 69. As each successive speed is employed the foot pedal 45 is preferably released in order to separate the drums 20 and 21 from the drum 19 before the lever 30 is adjusted. This separating of the drums, however, is not necessary as it will be readily seen that the disks 20 and 21 are so formed that they will not interfere with one another upon the sliding of the same to effect the various speed ratios. When the vehicle is rounding a corner the operator rotates the steering post 51 in the desired direction whereby the pulley 46 is rotated and carries therewith the cam 47. When the vehicle is to be turned, for instance to the left, the steering post 51 is rotated to the left and caused to move the cam 47 in such direction. The cam, when thus moved, strikes the roller 48 and throws the push rod 49 forwardly whereby the lever 53 is drawn forwardly at its outer end and swings about the arm 54 to force the slide rod 40 backwardly against the tension of the spring 42 connected to the rod 40 whereby the bell crank levers 37 connected to the rod 40 are thrown backwardly and move the journal bearings 33 outwardly upon the transverse beams 14 and 15 to separate the drum 20 from the drum 19 permitting the drum 20 to race and to allow the wheel 70 to revolve rapidly while rounding the corner. In this instance, the power is transmitted through the drum 21 to the inner wheel 71. When the vehicle is oppositely turned the reverse action takes place whereby the power is transmitted to the wheel 70 while the wheel 71 is permitted to race.

When it is desired to cut off the power from the car, the foot pedal 45 is released and is drawn backwardly to the limit of its movement by the springs 15ª, when the drums 20 and 21 are engaged against the brake shoes 92 to thereby retard the movement of the wheels 70 and 71 and drums 20 and 21 connected thereto. The braking is thus regulated by the backward position of the pedal 45 which forces the drums 20 and 21 into engagement with the shoes 92.

When it is desired to reverse the motion of the vehicle the operator throws the foot pedal 91 backwardly when the bell-crank lever 89 swings the link 88 inwardly to rotate the bell-crank levers 86 and 87 inwardly of the frame, and the sleeves 84 and 85 are oppositely moved in order to bring the beveled pinions 80 and 81 into contact with the beveled gears 82 and 83, whereby the rear axles 68 and 69 are caused to rotate backwardly.

Any conventional form of steering mechanism may be employed which admits of the employment of a steering post.

Although the drawings annexed hereto show a specific arrangement of the transmission mechanism with respect to the motor and reversing mechanism, it will be understood that various arrangements may be employed in view of this invention without departing from the spirit of the same, as it may be desired to locate the motor upon the frame otherwise than is herein disclosed.

Having thus described the invention, what is claimed as new is;

1. A transmission mechanism including a power shaft, a plurality of disks rigidly carried upon said power shaft and varying in diameter, a pair of jack shafts disposed upon the opposite sides of said power shaft, pluralities of disks mounted upon said jack shafts and varying in diameter for engaging with said disks on said power shaft, slide rods connected to said disks on said jack shafts for sliding the same, and reach rods connected to said jack shafts for vibrating the same with respect to said power shaft.

2. In combination, a casing, a power shaft centrally located in said casing, jack shafts loosely mounted in the opposite ends of said casing, guide ways located upon the opposite sides of said casing, bearings slidably positioned on the said guide ways, levers connected to said bearings to reciprocate the same in pairs, said bearings being provided for the reception of the opposite ends of said jack shafts, and drums mounted on said power shaft and said jack shafts for engagement with one another to transmit motion between said shafts.

3. In combination a casing, a power shaft centrally located in said casing, jack shafts slidably disposed through said casing upon the opposite sides of said power shaft, pluralities of disks mounted on said shafts for coöperative engagement with one another and brake shoes formed in the inner ends of said casing for engagement with the disks on said jack shafts upon the outward movement of the same.

4. In a transmission mechanism, the combination with a power shaft, and jack shafts, of drums carried by said shafts for engagement with one another, springs connected to said jack shafts for normally holding said drums out of engagement with one another, levers connected to said drums on said jack shafts to slide the same longitudinally with respect to the drum on said power shaft, and rods connected to said jack shafts for moving the same outwardly from said power shaft.

5. A transmission mechanism including a power shaft, a drum carried on the shaft, spaced jack shafts arranged at the opposite sides of said power shaft, drums keyed to said jack shafts for longitudinal movement, rods connected to said jack shafts for moving the same inwardly to contact the drums with one another, and levers connected to said jack shafts for independently releasing the drums thereon from the drum on said power shaft.

6. In a motor vehicle a longitudinal power shaft, a frame on the power shaft, jack shafts spaced on the opposite sides of said power shaft, drums carried by the jack shafts to engage said drum on said power shaft, bearings at the ends of said jack shafts for supporting the same, depending T-heads carried by the bearings, transverse guides for said bearings, links connected to said heads for moving the same, bell crank levers pivoted to said links, and rods hinged upon the long arms of said bell crank levers for moving said jack shafts toward and from said power shaft.

In testimony whereof I affix my signature in presence of two witnesses.

JOSEPH O. MICHAUD. [L. S]

Witnesses:
    HENRY W. NADEAU,
    IRENEE CYR.